(12) United States Patent
Murray et al.

(10) Patent No.: US 8,608,091 B2
(45) Date of Patent: Dec. 17, 2013

(54) DISPENSING GUN ASSEMBLY FOR MIXING AND DISPENSING PLURAL COMPONENT FOAM

(75) Inventors: Pat L. Murray, Spring, TX (US); E. Richard Huber, Houston, TX (US)

(73) Assignee: 3M Innovative Properties Company, Saint Paul, MN (US)

( * ) Notice: Subject to any disclaimer, the term of this patent is extended or adjusted under 35 U.S.C. 154(b) by 1306 days.

(21) Appl. No.: 11/196,689

(22) Filed: Aug. 3, 2005

(65) Prior Publication Data

US 2006/0208000 A1    Sep. 21, 2006

Related U.S. Application Data

(60) Provisional application No. 60/663,096, filed on Mar. 18, 2005.

(51) Int. Cl.
*F23D 11/46* (2006.01)

(52) U.S. Cl.
USPC .......................................... 239/414; 239/413

(58) Field of Classification Search
USPC ......... 239/414, 398, 407, 419, 461, 525, 526, 239/527, 413
See application file for complete search history.

(56) References Cited

U.S. PATENT DOCUMENTS

| | | | |
|---|---|---|---|
| 1,172,233 A * | 2/1916 | Day | ................................ 239/415 |
| 2,520,591 A | 8/1950 | Wilmarth | |
| 3,193,245 A | 7/1965 | Parker | |
| 3,558,100 A | 1/1971 | Hulsey | |
| 3,784,110 A | 1/1974 | Brooks | |
| 4,117,551 A | 9/1978 | Books et al. | |
| 4,169,545 A | 10/1979 | Decker | |
| 4,193,546 A | 3/1980 | Hetherington et al. | |
| 4,225,087 A | 9/1980 | Lawlor | |
| 4,263,166 A | 4/1981 | Adams | |
| 4,290,452 A | 9/1981 | Takahashi et al. | |
| 4,676,437 A * | 6/1987 | Brown | ........................ 239/414 |
| 4,925,107 A | 5/1990 | Brown | |
| 4,934,603 A * | 6/1990 | Lasley | ........................ 239/527 |
| 5,129,581 A | 7/1992 | Braun et al. | |
| 5,219,097 A | 6/1993 | Huber et al. | |
| 5,344,051 A | 9/1994 | Brown | |
| 5,526,957 A | 6/1996 | Brown et al. | |
| 5,529,245 A | 6/1996 | Brown | |
| 6,345,776 B1 | 2/2002 | Hurray et al. | |
| 6,705,539 B1 * | 3/2004 | Bien | ............................... 239/10 |

\* cited by examiner

*Primary Examiner* — Davis Hwu
(74) *Attorney, Agent, or Firm* — Douglas W. Rommelmann; Andrews Kurth LLP

(57) ABSTRACT

A dispensing gun assembly including a gun body having a handle and a housing attached to the gun body. The housing includes first and second fluid passageways and first and second valve receiving bores. The fluid passageways are segregated from one another within the housing. First and second valves are received in the valve receiving bores. Each valve has open and closed positions and the valves move within the valve receiving bores when changing between the open and closed positions. A trigger member controllably contacts the valves and a nozzle assembly is connected to the housing.

14 Claims, 10 Drawing Sheets

DISPENSING GUN ASSEMBLY FOR MIXING AND DISPENSING PLURAL COMPONENT FOAM

CROSS-REFERENCE TO RELATED APPLICATIONS

This application claims priority from U.S. Provisional Application Ser. No. 60/663,096, filed Mar. 18, 2005.

STATEMENTS REGARDING FEDERALLY SPONSORED RESEARCH OR DEVELOPMENT

Not applicable.

REFERENCE TO A MICROFICHE APPENDIX

Not applicable.

BACKGROUND OF THE INVENTION

1. Field of the Invention

The present invention relates generally to an apparatus for mixing and dispensing plural component foams, and more particularly, to a dispensing gun for mixing and dispensing a two-component urethane foam utilizing pressurized gas. Preferably, the dispensing gun is a disposable-type gun suitable for use as part of a disposable foam component kit.

2. Description of the Related Art

In recent years, improvements have been made in dispensing plural component synthetic materials, primarily foams, many of which are urethane foams or those involving similar chemistry. In such foams, an "A" or isocyanate component and a "B" or resin component are mixed in a mixing chamber adjacent the point of dispensing and the thus-formed mixture reacts in or near the dispensing nozzle. The combination of the heat from the reaction between the resin and the isocyanate components, and the reduced pressure resulting from passage outside a pressurized container causes a dissolved liquid propellant, such as a halocarbon of low boiling point, to expand and create a froth. Such expansion can also be used to create a propulsive force.

Systems of this sort have been placed in widespread use and have made it possible for a wide variety of users to derive the benefits of on-site generation and dispensing of urethane foam for purposes of insulation, flotation, void fill and the like. Further development enabled urethane foam to be mixed on-site and dispensed from kits that were light enough to be portable by users, and yet large enough to dispense significant quantities of foam. Typically, the kits that are readily portable are capable of mixing and dispensing 100-600 board feet of uniformly high quality urethane foam. Such foam usually has a finished density of 1.5 to 4.5 pounds per cubic foot ("pcf") and provides buoyancy, adhesion, structural rigidity and outstanding thermal insulation.

When the "A" and "B" components are mixed in proper proportions, they typically react quickly to form and solidify into an expanded foam. Foam dispensing guns must, therefore, be kept free from buildup of the foam components and resulting expanded foam, so that control valves and passageways do not become clogged, rendering the foam dispensing gun inoperable.

U.S. Pat. No. 5,529,245 discloses a low cost mixing and dispensing gun with a valve body containing a pair of liquid inlets, a pair of separate liquid outlets, a gas outlet and a removable mixing and dispensing nozzle. The nozzle contains the ingredients while they are being mixed and a gas outlet is positioned within the nozzle so as to propel the mixed ingredients to the application area.

There is a need for a foam dispensing gun having improved reliability and performance. It is desirable to have a foam dispensing gun with improved component mixing capabilities. It is also desirable to have these improved features in a foam dispensing gun suitable for throw-away use with a disposable portable foam component kit.

BRIEF DESCRIPTION OF THE DRAWINGS

A better understanding of the invention can be had when the following detailed description of the preferred embodiment is considered in conjunction with the following drawings, in which.

DESCRIPTION OF THE PREFERRED EMBODIMENTS OF THE INVENTION

Figure 1:
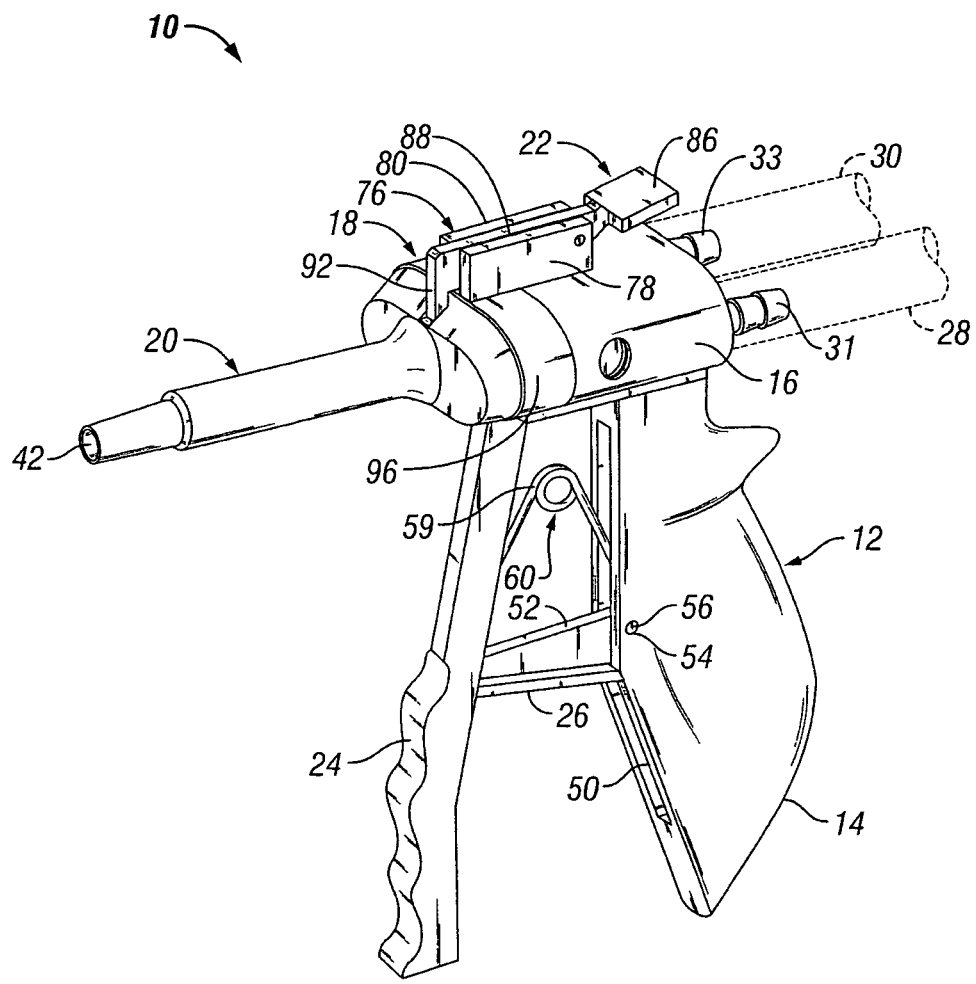
FIG. 1 is a perspective view of a dispensing gun assembly according to a preferred embodiment of the present invention, showing a pair of component inlet hoses in dashed lines attached to the dispensing gun assembly.

Referring to FIG. 1, a dispensing gun assembly according to a preferred embodiment of the present invention, generally designated 10, is shown to include a gun body 12 having a handle 14, a flow control valve housing 16, a nozzle receiver assembly 18, a removable nozzle assembly 20, a nozzle latch assembly 22, a trigger member 24, a trigger safety 26, and first and second component inlet hoses 28 and 30, each terminating in fittings 31 and 33, respectively.

Figure 2A:
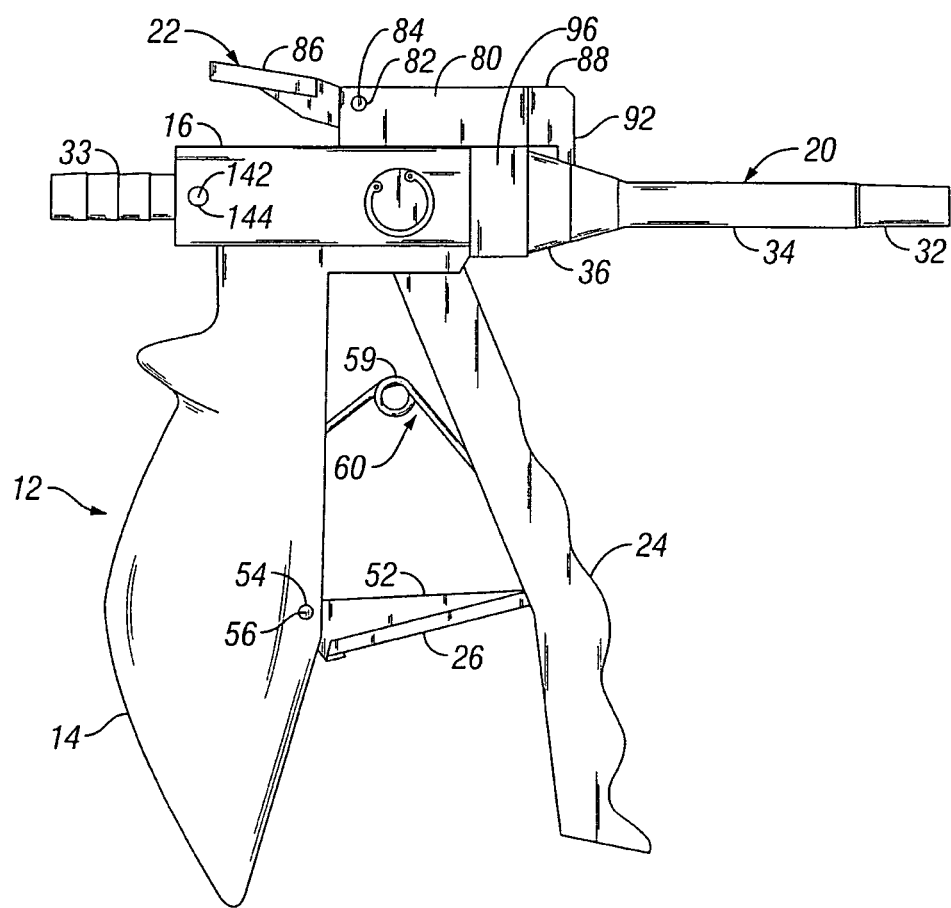
FIG. 2A is a side elevation view of the dispensing gun assembly of FIG. 1, the dispensing gun assembly in a typical position of use with a trigger in a closed position and a trigger safety engaged.
Figure 3A:
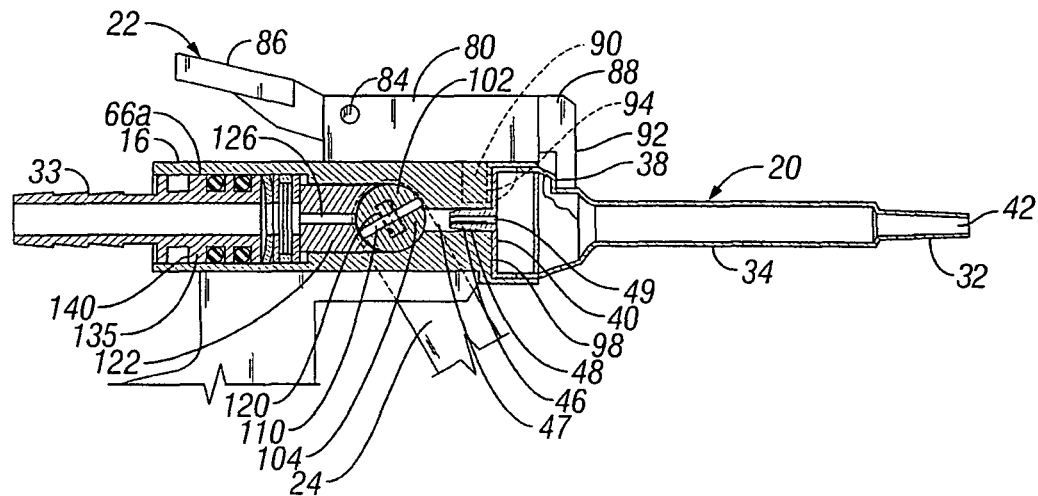
FIG. 3A is a side elevation view in partial section of a flow control valve housing and nozzle assembly of the dispensing gun assembly of FIG. 2A, showing the valve and trigger in the closed position.
Figure 4:
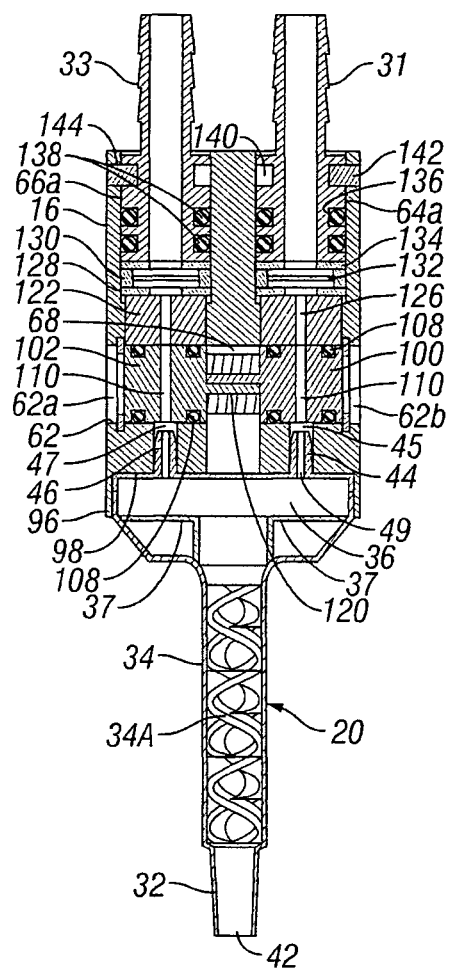
FIG. 4 is a section view taken along lines 4-4 of FIG. 3B.

Referring now to FIGS. 2A and 3A, it is shown that the nozzle assembly 20 includes an outlet tip portion 32, a static mixer portion 34, and a premix chamber 36. The nozzle assembly 20 also includes a latch-engaging surface 38 and an ejector-engaging rear face 40 as shown in FIG. 3A. At the inlet end of the nozzle assembly 20, a pair of nozzle inlet nipples 44 and 46 are provided, each of which is adapted to seat within outlet passages 45 and 47 in the flow control valve housing 16 as shown in FIG. 4. Each of the inlet nipples 44, 46 includes a plurality of flexible, outer plastic sealing ribs 48 and an inlet throughbore 49.

Figure 2B:
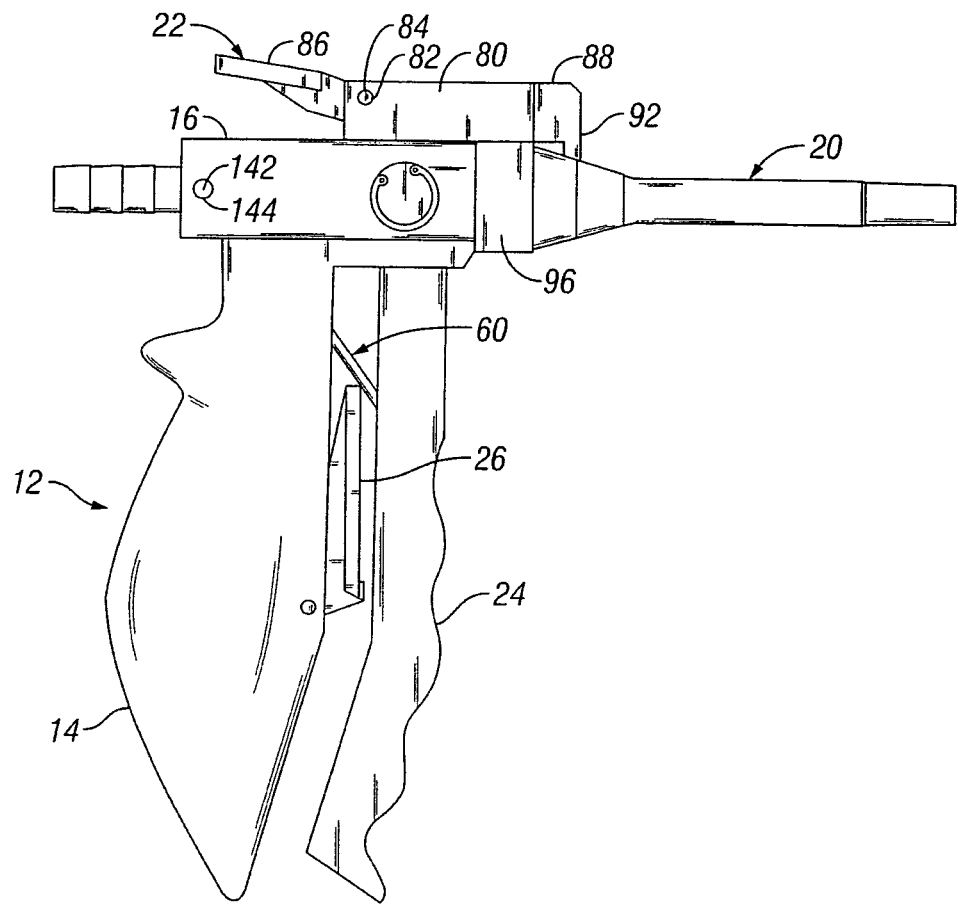
FIG. 2B is a side elevation view of the dispensing gun assembly similar to FIG. 2A, the dispensing gun assembly in a typical position of use with the trigger in an open position and the trigger safety disengaged.

Referring to FIGS. 1, 2A and 2B, the gun body 12 includes the handle 14 that is preferably contoured to provide a comfortable, ergonomic fit in a user's hand. The handle 14 includes a vertically extending recess 50 (FIG. 1) adapted to receive a center rib 52 of the trigger safety 26 when the trigger safety 26 is in a folded, disengaged or "off" position as shown in FIG. 2B. The handle 14 also includes an opening 54 adapted for reception of a pivot pin 56. The pivot pin 56 pivotally secures the trigger safety 26 to the handle 14. The pivot pin 56 may be integrally formed on the trigger safety rib 52 or extend through a hole in the rib 52. The handle recess 50 also provides a convenient receptacle for a portion of a trigger return spring 60 shown to be of the "clothespin" type, operating in response to torsional forces generated in its center coil 59. Although not shown, it is to be understood that the trigger member 24 preferably includes a recess for receiving a second portion of the trigger return spring 60.

Figure 5:
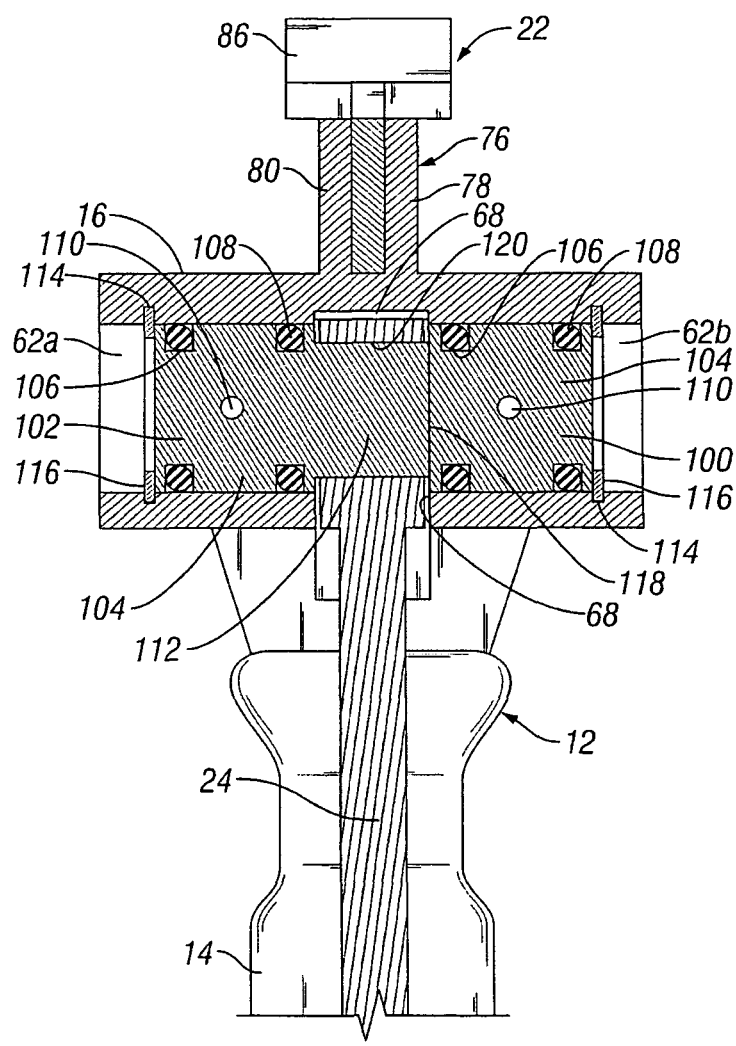
FIG. 5 is a front elevation view in partial section showing the valves and the flow control valve housing with the trigger in the open position.

Referring to FIGS. 4 and 5, the upper portion of the gun body 12 includes the flow control valve housing 16. The flow control valve housing 16 includes a valve receiving bore 62 extending transversely to the principal axis of the housing 16. The control valve housing 16 also includes a pair of product flow passageways 64 and 66 extending axially through the housing 16 as shown in FIG. 4.

Figure 3B:
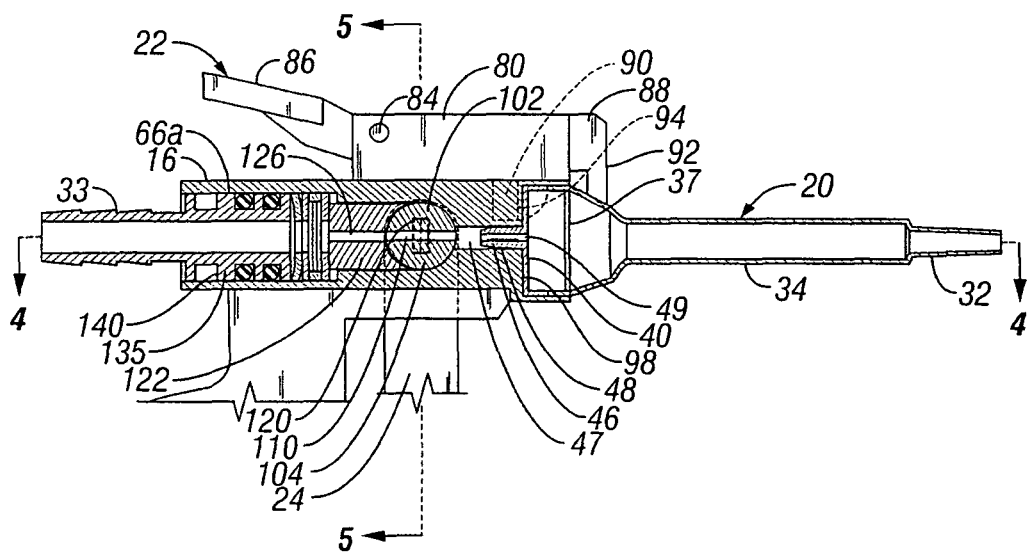
FIG. 3B is a side elevation view in partial section similar to FIG. 3A, showing the valve and trigger in the open position.

Referring to FIG. 1, surmounting the housing 16 is the nozzle latch assembly 22. The nozzle latch assembly 22 includes a latch receiver 76 having generally parallel side walls 78, 80, designed to snugly engage a latch and ejector member 74 when in the locking position. Each side wall 78, 80 includes a small opening 82 for receiving a pivot pin 84 extending through a hole (not shown) in the latch and ejector member 74. This latch and ejector member 74 is shown to comprise a rocker-style lever assembly having a finger tab 86 lying to one side of the pivot pin 84 and generally horizontally and vertically extending legs 88 and 90, respectively, on the opposite side of the pivot pin 84. The end portion of the latching leg 88 terminates in a claw 92, while a front face 94 of the ejector leg 90 acts to engage the rear face 40 of the nozzle assembly 20 as shown in FIGS. 3A and 3B. Preferably, the latch receiver 76 has its side walls 78, 80 spaced such that these walls snugly engage the legs 88, 90 of the latch and ejector member 74, preventing it from moving freely and inadvertently ejecting the nozzle assembly 20.

The nozzle receiver assembly 18 is disposed at the forward end of the housing 16 and includes a nozzle guide surface 96 terminating at its inner end in a front wall portion 98. The outlet passages 45 and 47 form a forward portion of the product flow passageways 64 and 66 and extend through the front wall portion 98 to the valve receiving bore 62 as shown in FIGS. 3A, 3B and 4.

Figure 6:
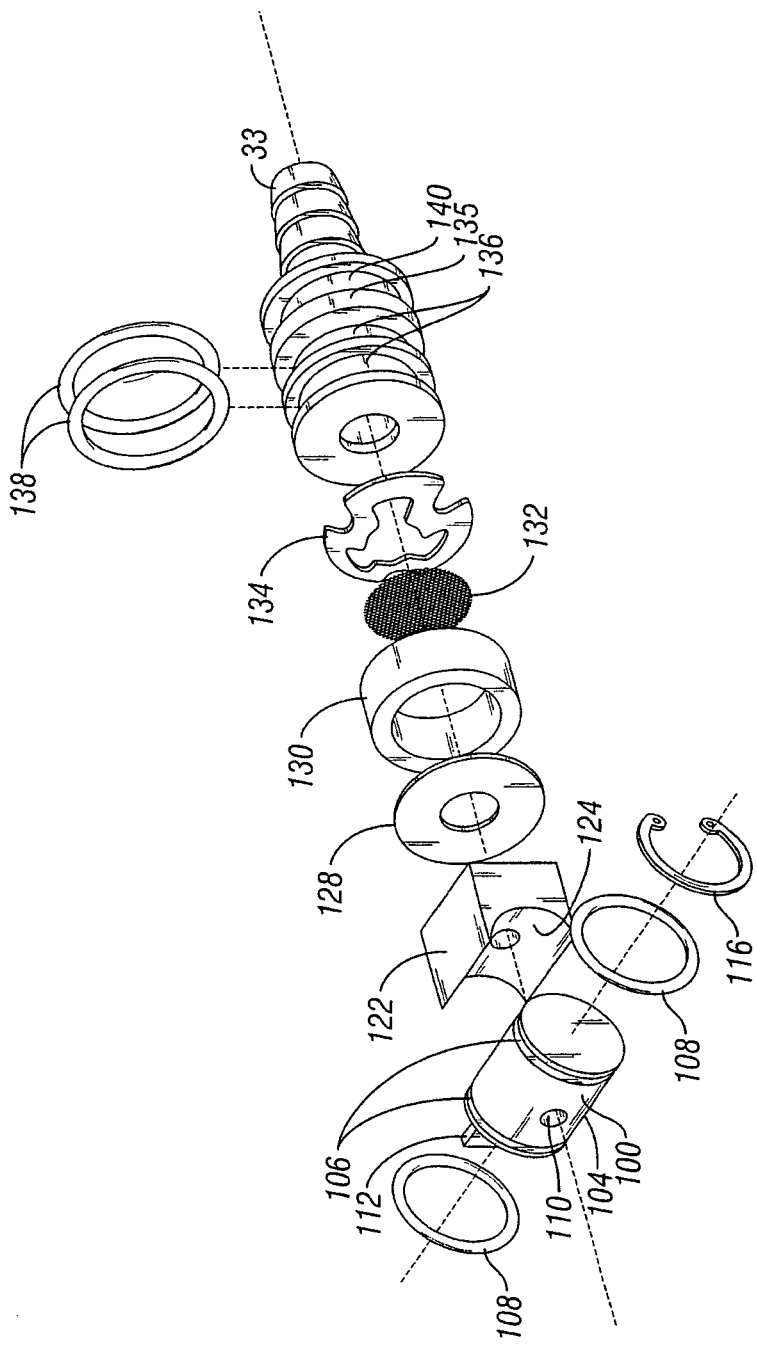
FIG. 6 is an exploded perspective view of the valve and related components which are housed in the flow control valve housing of the dispensing gun assembly according to a preferred embodiment of the present invention.

Referring to FIGS. 4-6, first and second rotary valves 100 and 102, respectively, have a cylindrical body 104 with a pair of circumferential recesses 106, each adapted to receive a seal 108, preferably an O-ring seal. The body 104 includes a transverse fluid port 110 extending therethrough. An ear 112 extends from one end of the cylindrical body 104. Preferably, the ear 112 is positioned slightly off-center of the principal axis of the cylindrical body 104 such that the ears 112 of the valves 100 and 102 overlap each other in abutting contact when the valves 100 and 102 are in the valve receiving bore 62 as shown in FIG. 4.

Referring to FIG. 5, a pair of grooves 114, formed in the receiving bore 62, receive retaining rings 116, preferably snap rings, for retaining the rotary valves 100 and 102 within the valve receiving bore 62. Preferably, the ears 112 have an end surface 118 which abuts the cylindrical body 104 of the other valve and the spacing between the retaining rings 116 is designed to accommodate the two valves 100 and 102 with their overlapping ears 112 and restrict valve movement along the principal axis of the valve receiving bore 62 while allowing rotational movement about the principal axis.

As shown in FIG. 5, the cylindrical body 104 has a diameter slightly less than the diameter of the valve receiving bore 62. A seal 108 is located on each side of the fluid port 110. The pair of seals 108 of each valve 100, 102 form a fluid seal between the cylindrical body 104 and the bore 62 of the housing 16.

Referring to FIGS. 3A, 3B, 4 and 5, the trigger member 24 includes an upper slot 120 extending through the trigger member 24. The upper slot 120 is adapted to receive the overlapping valve ears 112. The upper slot 120 is preferably the shape of the overlapping ears 112, which in the preferred embodiment is rectangular. The upper slot 120 is sized and shaped to receive the overlapping ears 112 with a minimal clearance.

As shown in FIG. 5, the valve housing 16 includes a trigger receptacle 68 for receiving the upper end of the trigger member 24. The trigger member 24 is installed by sliding the first and second rotary valves 100 and 102, respectively,. into the receiving bore 62 from opposite ends of the bore 62. The trigger slot 120 is positioned in the trigger receptacle 68 as the valve ears 112 enter the trigger receptacle 68. The valves 100, 102 may need to be rotated to align the ears 112 with the trigger slot 120. Upon proper alignment, the valves 100, 102 are fully inserted in the valve receiving bore 62 with the ears 112 overlapping each other and the ear end surfaces 118 abutting the opposing valve body 104. Upon full insertion of the valves 100 and 102, the retaining rings 116 are installed in the grooves 114.

The trigger member 24 depends from the overlapping ears 112 and pivots about the principal axis of the valve receiving bore 62. Rotational movement of the trigger member 24 results in corresponding rotational movement of the valves 100 and 102.

Preferably, when the trigger member 24 is in the open position (see FIGS. 2B and 3B), the fluid port 110 of each valve 100, 102 is in fluid communication with the corresponding outlet passage 45, 47. When the trigger member 24 is in the closed position (see FIGS. 2A and 3A), the fluid port 110 of each valve 100, 102 is not in fluid communication with the corresponding outlet passage 45, 47.

Referring to FIGS. 3A, 3B, 4 and 6, a pair of rotary valve seals 122, preferably of teflon, each having an arcuate surface 124 corresponding to the cylindrical valve body 104, is held in contacting relationship with the valve body 104. The valve seal 122 includes a port 126 which aligns with the transverse fluid port 110 when the trigger member 24 is in the open position as shown in FIG. 3B. Preferably, the valve seal 122 has a width no greater than the spacing between the pair of seal recesses 106 in the valve body 104 as shown in FIG. 4. This allows each seal 108 to form a continuous seal with the wall defining the valve receiving bore 62.

As shown in FIG. 6, behind the rotary valve seal 122 is preferably a washer 128, a filter ring 130 and filter screen 132, a washer 134, preferably a spring-type washer such as a Belleville washer, and the hose connector fitting 31 or 33 received in each product flow passageway 64, 66 (FIG. 4). Preferably, each fitting 31, 33 includes an enlarged portion 135 having a plurality of seal recesses 136 for receiving a plurality of seals 138, preferably O-ring seals. Preferably, each fitting 31, 33 also includes a retaining groove 140 to receive a retaining member 142, for example a pin or screw, inserted through a hole 144 in the flow control valve housing 16.

Referring now to FIGS. 1 and 3A, the assembled gun 10 is shown in an inactive position of use with the trigger 24 forward and the rotary valve 102 in a closed position. As shown in FIG. 1 the gun body 12 is shown assembled with a pair of component inlet hoses 28 and 30 (in phantom lines) connected to the hose connector fittings 31 and 33. The product flow passageways 64 and 66 include a large smooth counter bore 64*a* and 66*a*, respectively, in the housing 16. The annular seals 138 on the large portion 135 of the hose connector fittings 31, 33 facilitate sealing of the fittings 31, 33 within the large smooth counter bore 64*a*, 66*a* in fluid-tight relation as shown in FIGS. 3A and 4. The retaining members 142 (FIG. 4) removably hold the fittings 31, 33 in place in the counter bores 64*a*, 66*a*.

As shown in FIG. 3A, the rotary valves 102 and 104 are positioned such that fluids may not flow through valve fluid ports 110 when the trigger 24 is in its forward or closed position. As shown in FIG. 2A, the return spring 60 forces the trigger 24 to its forward position and the safety 26 is shown in its engaged position to lock the trigger 24 in its closed position. In the closed position, the fluid port 110 of each rotary valve 100, 102 is out of registry with either of the adjacent passages, those being the valve seal port 126 and the outlet passage 45, 47. Forward product flow from the supply hoses 28, 30 is blocked by the sealing engagement of the arcuate surface 124 of the rotary valve seal 122 with the surface of the cylindrical body 104 of the valve 100, 102 in addition to the sealing engagement of the valve cylindrical body 104 with the valve receiving bore 62. Preferably, the spring-type washer 134 indirectly maintains an axial force on the valve seal 122 in the direction of the valve 100, 102.

The combination of the various bores and passages, including those in the hoses 28, 30, connector fittings 31, 33 washers 128, 134, rings 130 and screens 132, and seals 122, combine to comprise a pair of inlet passages. Flow through the outlet passages 45 and 46 is controlled by the movement of the rotary valves 100 and 102. In the preferred embodiment, the housing 16 contains coaxially aligned pairs of passages and a flow control valve for each passage. In the preferred embodiment as shown in FIG. 4, there are no closed passageways or cavities interconnecting the aligned pairs of fluid passages in the gun body 12 which eliminates the possibility of the fluid components leaking past seals and reacting with each other to cause premature operation failure. As described above and as shown in FIG. 5, the valve receiving bore 62 containing the valves 100, 102 is in actuality two aligned bores 62*a* and 62*b* separated by the intermediate trigger receptacle 68.

As shown in FIG. 2B, the safety 26 has been moved to a disengaged position and the trigger 24 has been pulled to a fully opened position compressing the spring 60. Fluid is thus free to flow through the passages formed as described above. The separated fluid components enter the removable nozzle assembly 22 where they initially mix and react with each other prior to being dispensed from the nozzle opening 42.

Referring to FIGS. 3A and 3B, the claw 92 on the latch and ejector member 74 engages the latch-engaging surface 38 of the nozzle 20 during operation of the dispensing gun assembly 10. The ejector-engaging rear face 40 of the nozzle 20 abuts or is adjacent the front wall portion 98 of the nozzle receiver assembly 18, while the front face 94 of the ejector leg 90 engages or is adjacent the nozzle rear face 40 in the area between the nozzle nipples 44 and 46.

When it is desired to remove the nozzle assembly 20 from the gun body 12, the nozzle assembly 20 can be ejected by depressing the finger tab 86 of the latch and ejector member 74. Upon depressing the finger tab 86, the latch and ejector member 74 pivots about the pivot pin 84 and provides both an ejection lever action and an unlocking or unlatching action. The pivoting movement results in a cooperative action between the nozzle receiver assembly 18 and the nozzle 20. Depressing the finger tab 86 both releases the latch claw 92 and causes the ejector leg 90 to rotate against the nozzle rear face 40 and eject the nozzle assembly 20. When reloading a nozzle assembly 20, the full insertion of the nipples 44 and 46 in the outlet passages 45 and 47 results in the ejector leg 90 retracting and the latch claw 92 engaging the latch-engaging surface 38 of the nozzle 20.

In its preferred form, the entire gun just described may be made from plastic materials, with the exception of the rotary valves, the fasteners, and the hose end fittings. An advantage of the preferred embodiment of the present invention is that there is completely separated fluid component passages through the gun body 12 which eliminates the possibility of the chemical streams from "crossover" and reacting inside the flow control valve housing 16.

Preferably, the nozzle assembly 20 includes the premix area 36 adjacent to where the component streams enter the nozzle assembly 20 prior to passing through a static mixer 34A in the static mixer portion 34 and exiting through the outlet tip portion 32. The static mixer 34A may include a plurality of joined helical sections in which each section is rotated approximately 90 degrees (90°) from the adjacent section. The static mixer 34A as described and shown is known in the art. It is to be understood that the static mixer 34A has been omitted from FIGS. 3A, 3B and 7.

Referring to FIG. 4, the nozzle assembly 20 preferably includes a baffle or deflector 37 to redirect each component stream in the premix area 36. The deflector 37 is preferably substantially transverse to the direction of the fluid streams as they exits the inlet nipples 44 and 46. The deflectors 37 interrupt the laminar flow of each stream and preferably redirects each stream approximately 90 degrees (90°) so that the two streams impinge each other within the premix area 36. Impinging the two streams within the premix area 36 improves the material mix through the static mixer portion 34.

In use, the remote ends of the hoses are connected to component supply tanks, preferably disposable tanks, in a known manner. When a nozzle assembly 20 is fully seated in the nozzle receiver assembly 18, it is held in place by engagement with the latch claw 92. Actuating the trigger 24 performs the steps necessary to discharge a foaming plastic product through the nozzle outlet 42. The foam components are kept separate from each other during flow through the flow control valve housing 16 and initially mix with each other in the nozzle assembly 20, preferably in the premix chamber 36. If work is to be discontinued for a time sufficient for the foaming products to react and "set up" in the nozzle mix chamber, the nozzle assembly 20 may be removed and replaced and the process begun again. The gun assembly 10 may be used with a number of nozzle assemblies 20 for several applications. The gun assembly 10 is sufficiently economical that it can be discarded after the contents of the tanks are emptied although it can be easily cleaned and rebuilt, if desired, at minimal cost without the use of skilled labor.

Figure 7:
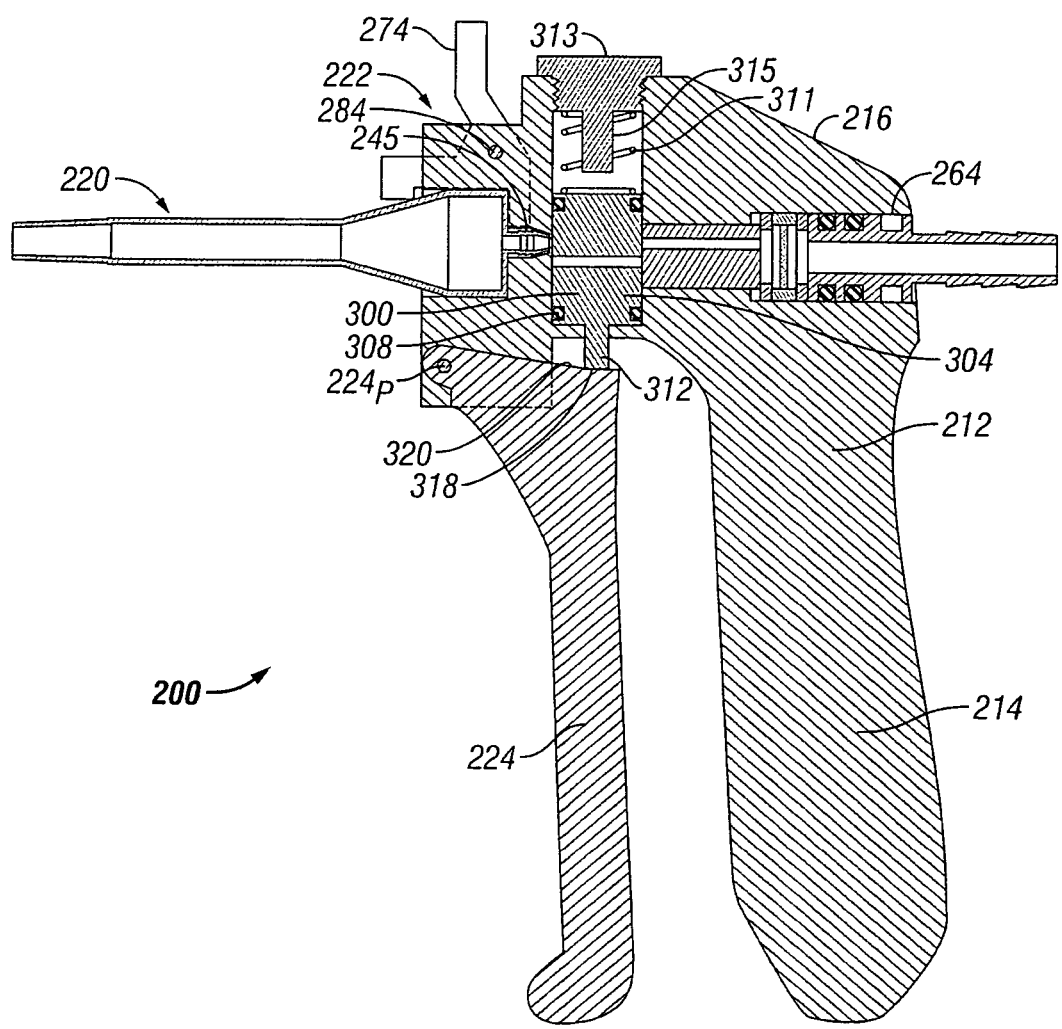
FIG. 7 is a side elevation view, in section taken through one of the valves, of a second embodiment of the dispensing gun assembly according to the present invention, the dispensing gun assembly employing piston valves and shown in a typical position of use with a trigger in a closed position.

Referring to FIG. 7, a dispensing gun assembly according to a second embodiment of the present invention, generally designated 200, is shown to preferably include a gun body 212 having a handle 214, a flow control valve housing 216, a nozzle receiver assembly 218 (FIG. 8A), a removable nozzle assembly 220, a nozzle latch assembly 222, and a trigger member 224. It is to be understood that the dispensing gun assembly 200 preferably includes a trigger safety (not shown) and hose connector fittings for first and second component inlet hoses as described above for the dispensing gun assembly 10. A primary difference between the dispensing gun assembly 200 from the dispensing gun assembly 10 is the arrangement and operation of the valves which will be explained below.

Figure 8A:
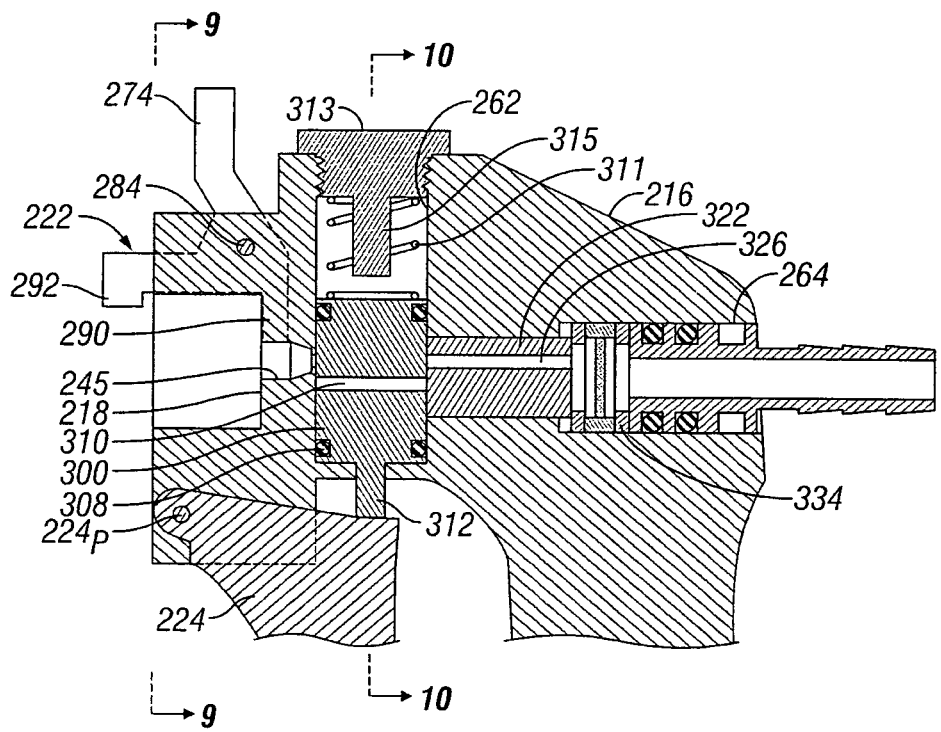
FIG. 8A is a partial side elevation view, in section of the dispensing gun assembly of FIG. 7 with the nozzle assembly removed, showing the valve and trigger in the closed position.
Figure 10:
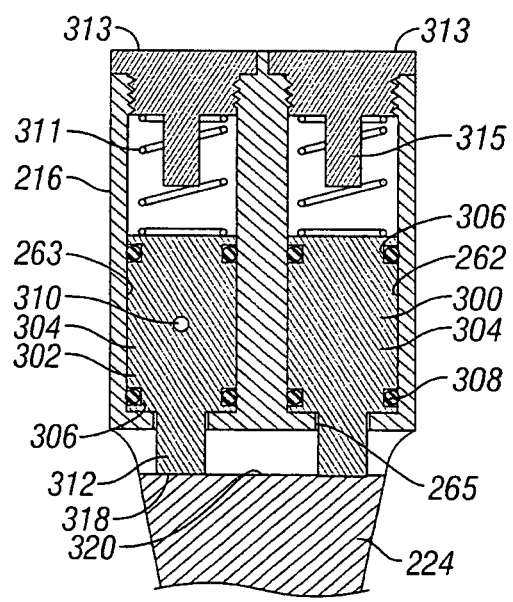
FIG. 10 is a view taken along lines 10-10 of FIG. 8A.

Referring to FIGS. 7 and 8A, the upper portion of the gun body 212 includes the flow control valve housing 216. The flow control valve housing 216 includes a pair of valve receiving bores 262 and 263 extending transversely to the principal axis of the housing 216 as shown in FIG. 10. The control valve housing 216 also includes a pair of product flow passageways 264 (FIG. 8A) extending axially through the housing 216. While only one of the product flow passageways 264 is shown, it is to be understood that the second passageway is preferably identical to the passageway 264 shown and similar to the product flow passages 64 and 66 for the dispensing gun assembly 10 as shown in FIG. 4.

Referring to FIGS. 7, 8A and 10, first and second piston valves 300 and 302, respectively, have a cylindrical body 304 with a pair of circumferential recesses 306, each adapted to receive a seal 308, preferably an O-ring seal. The body 304 includes a transverse fluid port 310 extending therethrough. An ear 312 extends from one end of the cylindrical body 304. Preferably, the ear 312 is on the principal axis of the cylindrical body 304. The ear 312 includes an end surface 318 adapted to contact an engagement surface 320 of the trigger member 224. The trigger member 224 is preferably pivotally connected to the gun body 212 about a pivot point 224p. Although not shown, it is to be understood that the dispensing gun assembly 200 preferably includes a trigger return spring as described above for the dispensing gun assembly 10.

As shown in FIGS. 7, 8A, 8B and 10, a return spring 311, preferably a helical spring, is positioned in each valve receiving bore 262, 263 between a cap screw 313 and the respective piston valve 300, 302. Preferably, each cap screw 313 includes a stop member 315 extending at a lower end of the cap screw 313 for reasons which will be explained below.

Figure 9:
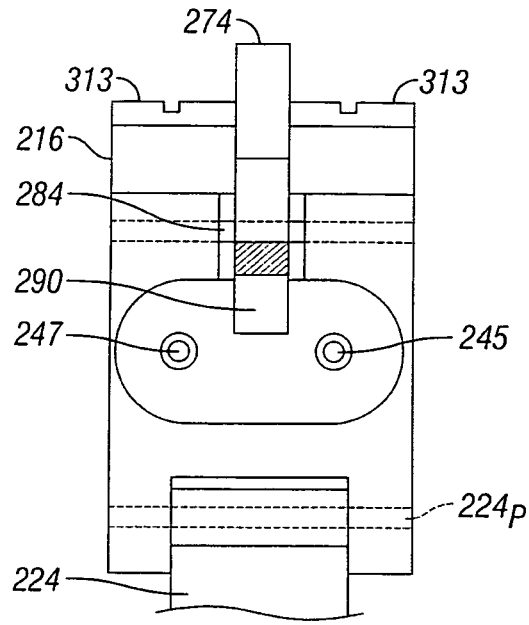
FIG. 9 is a view taken along lines 9-9 of FIG. 8A.

Referring to FIGS. 7 and 9, the nozzle latch assembly 222 includes a latch and ejector member 274 pivotally connected via a pin 284 to a forward portion of the housing 216. The latch/ejector member 274 includes a claw 292 and an ejector leg 290. The claw 292 and ejector leg 290 function in the same manner as claw 92 and ejector leg 90 of the latch/ejector member 74 of the first embodiment.

When the trigger 224 and the valves 300 and 302 are in their closed position as shown in FIGS. 7 and 8A, the return springs 311 apply a spring force against the upper end of the piston valves 300 and 302 causing the valves 300 and 302 to assume their closed, lowermost position within the valve receiving bores 262 and 263. In the closed position, the fluid ports 310 of the valves 300 and 302 are out of registry with the valve seal ports 326 of the valve seals 322. Additionally, the fluid ports 310 are preferably out of registry with the outlet passages 245 and 247 (see FIGS. 8A and 9). It is to be understood that the closed position shown in FIG. 8A the cylindrical body 304 of the valves 300 and 302 is in sealing engagement with an arcuate surface (now shown) of the valve seals 322 and also in sealing engagement with the valve receiving bore 262. As described in the previous embodiment, preferably spring-type washers 334 exert an axial force on the valve seals 322 in the direction of the valves 300 and 302.

With reference to FIGS. 8A and 10, the return springs 311 surround the stop members 315 to ensure that the return springs 311 remain axially oriented within the valve receiving bores 262 and 263. Preferably, the cap screws 313 threadably engage the upper end of the valve receiving bores 262 and 263. The lower or opposite end of the bores 262 and 263 include an aperture 265 adapted to receive the ears 312 of the valves 300 and 302. Preferably, the ears 312 and the apertures 265 are sized to allow sliding movement of the ears 312 in the apertures 265. Preferably, the apertures substantially restrict angular rotation of the valves 300 and 302 within the valve receiving bores 262 and 263 to maintain substantially parallel alignment of the fluid ports 310 with the valve seal ports 326 and outlet passages 245 and 247.

Figure 8B:
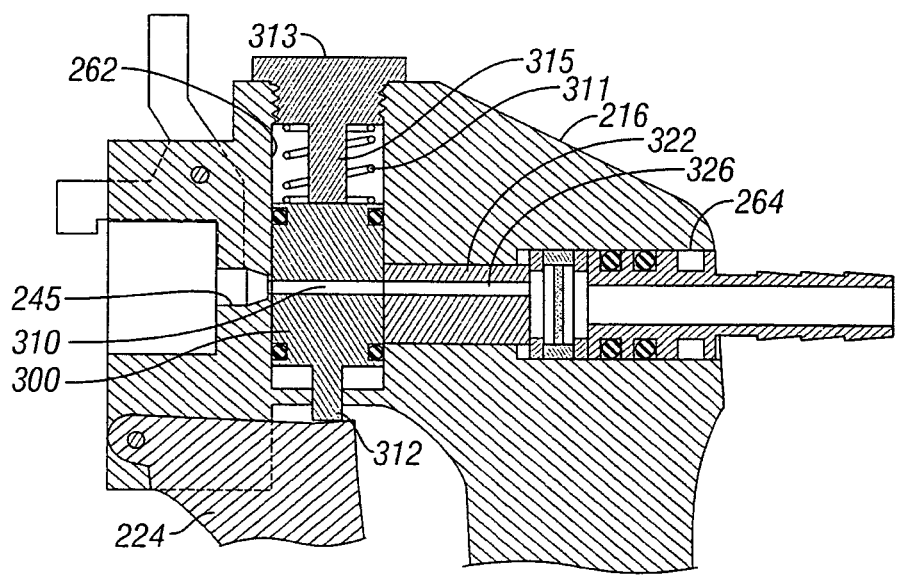
FIG. 8B is a view similar to FIG. 8A, showing the valve and trigger in the open position.

Referring to FIG. 8B, upon "squeezing" the trigger 224, the trigger 224 forces the valves 300 and 302 to their open or uppermost position in which the fluid ports 310 are substantially axially aligned with the valve seal ports 326 and the outlet passages 245 and 247. In the open position, the return springs 311 are compressed and the valves 300 and 302 abut the lower end of the stop members 315. The stop members 315 ensure the proper axial positioning of the valves 300 and 302 in the valve receiving bores 262 and 263 in the open position.

Upon release of the trigger 224, the return springs 311 force the valves 300 and 302 to the closed position. It is to be understood that the return springs 311 could alternatively be located exteriorly of the valve receiving bores 262 and 263. For example, the valve ears 312 could be connected to the trigger 224 and one or more return springs positioned between the trigger and the gun body 212 or between the trigger 224 and the flow control valve housing 216.

While the advantages of the invention may be achieved and practiced by the use of other embodiments, the preferred embodiments of the invention are of the type shown, wherein the gun assembly is made principally from plastic material and includes the various structural and functional features described in detail.

We claim:

1. A dispensing gun assembly for mixing a first reactive fluid component and a second reactive fluid component and dispensing the mixed reactive components, the assembly comprising:
   a gun body;
   a housing attached to said gun body, said housing including first and second fluid passageways arranged and designed for the first and second reactive fluid components respectively, said fluid passageways being segregated from one another within said housing, said segregated fluid passageways defined by an absence of a passageway within said housing interconnecting said first and second fluid passageways, said housing including a trigger receptacle positioned between said first and second fluid passageways, said trigger receptacle having a downwardly facing opening;
   a first valve operably positioned within said housing in said first fluid passageway;
   a second valve operably positioned within said housing in said second fluid passageway;
   a trigger member controllably contacting said first and second valves within said trigger receptacle and being proximate said gun body; and
   a nozzle assembly connected to said housing.

2. The assembly of claim 1, wherein each of said first and second valves include a cylindrical body having a transverse port therethrough.

3. The assembly of claim 2, wherein each of said first and second valves has an open position and a closed position and said first and second valves partially rotate when changing between said open and closed positions.

4. The assembly of claim 2, wherein each of said first and second valves has an open position and a closed position and said first and second valves move substantially transverse to said first and second fluid passageways when changing between said open and closed positions.

5. The assembly of claim 1, wherein said first valve is in a first valve receiving bore and said second valve is in a second valve receiving bore, said first valve receiving bore intersecting said first fluid passageway and said second valve receiving bore intersecting said second fluid passageway.

6. The assembly of claim 5, wherein said trigger receptacle is positioned between said first and second valve receiving bores.

7. The assembly of claim 1, wherein said nozzle assembly comprises a pair of inlet nipples, a premix portion, a static mixer portion, an outlet portion, and a baffle, said baffle adapted to redirect flow of first and second fluid streams entering through said pair of inlet nipples so as to cause impingement of the fluid streams in said premix portion.

8. The assembly of claim 1, wherein each of said first and second valves has an open position and a closed position and said valves are spring-biased to said closed position.

9. The assembly of claim 8, wherein said first valve is in a first valve receiving bore and said second valve is in a second valve receiving bore, said first valve receiving bore intersecting said first fluid passageway and said second valve receiving bore intersecting said second fluid passageway.

10. The assembly of claim 9, further comprising:
a first return spring in said first valve receiving bore; and
a second return spring in said second valve receiving bore.

11. A dispensing gun assembly for mixing a first reactive fluid component and a second reactive fluid component and dispensing the mixed reactive components, the assembly comprising:
a gun body having a handle;
a flow control valve housing connected to said gun body, said flow control valve housing including first and second fluid passageways arranged and designed for the first and second reactive fluid components respectively, said first fluid passageway being segregated from said second fluid passageway within said flow control valve housing, said segregated fluid passageways further defined by an absence of an enclosed flow path interconnecting said first and second fluid passageways within said flow control valve housing, said flow control valve housing having a trigger receptacle positioned between said first and second fluid passageways, said trigger receptacle having a downwardly facing opening;
a first valve operably positioned in said first fluid passageway;
a second valve operably positioned in said second fluid passageway;
a trigger member controllably contacting said first and second valves within said trigger receptacle, said trigger member being proximate said handle; and
a nozzle assembly connected to said flow control valve housing.

12. The assembly of claim 11, wherein each of said first and second valves has an open position and a closed position and said first and second valves partially rotate when changing between said open and closed positions.

13. The assembly of claim 11, wherein said first valve is in a first valve receiving bore and said second valve is in a second valve receiving bore, said first valve receiving bore intersecting said first fluid passageway and said second valve receiving bore intersecting said second fluid passageway.

14. The assembly of claim 13, wherein said trigger receptacle is positioned between said first and second valve receiving bores.

\* \* \* \* \*

UNITED STATES PATENT AND TRADEMARK OFFICE
CERTIFICATE OF CORRECTION

PATENT NO. : 8,608,091 B2  Page 1 of 1
APPLICATION NO. : 11/196689
DATED : December 17, 2013
INVENTOR(S) : Pat Murray It is certified that error appears in the above-identified patent and that said Letters Patent is hereby corrected as shown below:

In the Specification

Column 2
Line 47, delete "section" and insert -- section, --

Line 53, delete "10- 10" and insert -- 10-10 --

Column 4
Line 31, delete "respectively,." and insert -- respectively --

Column 5
Line 13, delete "FIG. 1" and insert -- FIG. 1, --

Line 42, delete "33" and insert -- 33, --

Line 55, delete "62aand" and insert -- 62a and --

Column 7
Line 64, delete "FIG. 8A" and insert -- FIG. 8A, --

Signed and Sealed this
Seventeenth Day of June, 2014

Michelle K. Lee
*Deputy Director of the United States Patent and Trademark Office*